United States Patent [19]

Pagano

[11] Patent Number: 4,914,462
[45] Date of Patent: Apr. 3, 1990

[54] METERING DEFEAT MECHANISM

[75] Inventor: Daniel M. Pagano, Henrietta, N.Y.

[73] Assignee: Eastman Kodak Company, Rochester, N.Y.

[21] Appl. No.: 349,474

[22] Filed: May 9, 1989

[51] Int. Cl.⁴ ............................................... G03B 1/00
[52] U.S. Cl. ....................................................... 354/213
[58] Field of Search ................................. 354/213, 215

[56] References Cited

U.S. PATENT DOCUMENTS

| | | | |
|---|---|---|---|
| 988,341 | 4/1911 | Hill | 242/71.8 |
| 1,221,847 | 4/1917 | Elmstrom et al. | 354/212 |
| 1,871,983 | 8/1932 | Goldhammer | 242/74 |
| 1,921,559 | 8/1933 | Case | 354/212 |
| 2,541,476 | 2/1951 | Mihalyi | 242/71.1 |
| 2,559,892 | 7/1951 | Mihalyi et al. | 242/71.4 |
| 2,701,507 | 2/1955 | Bergerhoff | 354/212 |
| 3,234,024 | 2/1966 | Leinonen | 430/500 |
| 3,556,435 | 1/1971 | Wangerin | 242/210 |
| 3,659,799 | 5/1972 | Cerutti et al. | 242/71.9 |
| 3,665,830 | 5/1972 | Maeda | 354/213 |
| 3,677,499 | 7/1972 | Wengerin | 242/210 |
| 3,774,513 | 11/1973 | Ettischer et al. | 354/213 X |
| 3,797,777 | 3/1974 | Hosono et al. | 242/197 |
| 3,913,115 | 10/1975 | Mueller et al. | 354/215 X |
| 4,223,990 | 9/1980 | Edwards | 354/213 X |
| 4,294,713 | 10/1981 | Knollmueller et al. | 352/28 |
| 4,295,713 | 10/1981 | Edwards | 352/235 |
| 4,303,325 | 12/1981 | Seely | 354/212 |
| 4,407,579 | 10/1983 | Huff | 354/275 |
| 4,420,236 | 12/1983 | Taniguchi et al. | 354/21 |
| 4,423,943 | 1/1984 | Gold | 354/275 |
| 4,488,796 | 12/1984 | Edwards | 354/275 |

*Primary Examiner*—L. T. Hix
*Assistant Examiner*—Brian W. Brown
*Attorney, Agent, or Firm*—Roger A. Fields

[57] ABSTRACT

A photographic camera is disclosed for use with a film cassette in which a filmstrip has a row of metering perforations in its imaging portion, adjacent a longitudinal film edge, for engagement with a metering pawl of the camera, and a row of take-up perforations in its leader portion, adjacent the same film edge, for engagement with a take-up spool of the camera, and a film spool is rotatable to unwind the film strip off the spool to thrust the leader portion from the cassette. The camera includes a film sensing member for normally maintaining the metering pawl removed from a film advance path between the cassette and the take-up spool to prevent the pawl from erroneously engaging the leader portion at one of its take-up perforations. The sensing member is actuated to release the metering pawl, to allow the pawl to be moved into the film advance path to engage the imaging portion at one of its metering perforations, only after the leader portion has been advanced sufficiently from the cassette to move its take-up perforations out of reach of the pawl.

5 Claims, 9 Drawing Sheets

METERING DEFEAT MECHANISM

CROSS-REFERENCE TO RELATED APPLICATIONS

Reference is made to commonly assigned copending applications Ser. No. 07/349,480 entitled PHOTOGRAPHIC FILM AND FILM CASSETTE, and filed May 9, 1989, in the name of Patricia D. Fairman, and Ser. No. 221,955, U.S. Pat. No. 4,855,773 entitled MOTOR-DRIVEN FILM TRANSPORT APPARATUS, and filed July 20, 1988, in the name of Donald M. Harvey. Ser. No. 221,995 is incorporated in this application by reference.

BACKGROUND OF THE INVENTION

1. Field of the Invention

The invention relates specifically to the field of photography, and particularly to a metering defeat mechanism for a photographic camera.

2. Description of the Prior Art

In conventional 35 mm film manufacturers' cassettes, such as manufactured by Eastman Kodak Company and Fuji Photo Film Co. Ltd., the filmstrip is wound on a flanged spool which is rotatably supported within a cylindrical shell. A leading portion of the filmstrip approximately 2⅜ inches long, commonly referred to as a "film leader", protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader portion protruding from the slit will remain stationary. The film roll can expand radially until a firm non-slipping relation is established between its outerost convolution and the inner curved wall of the shell. Once this non-slipping relation exists, there is a binding effect between the film roll and the shell which prevents further rotation of the spool in the unwinding direction. Consequently, rotation of the spool in the unwinding direction cannot serve to advance the filmstrip out of the shell, and it is necessary in the typical 35mm camera to engage the protruding leader portion to draw the filmstrip out of the shell. Typically, the leader portion includes a series of take-up perforations located along the same longitudinal edge as a row of similarly spaced metering perforations in the imaging portion of the filmstrip, as in U.S. Pat. No. 3,665,830, or a hole proximate a forward edge of the leader portion, as in U.S. Pat. Nos. 4,295,713 and 4,303,325, for engagement with a corresponding tooth of a take-up spool in the camera.

A 35 mm film cassette has been proposed which, unlike conventional film cassettes, can be operated to automatically advance the filmstrip out of the cassette shell by rotating the film spool in the unwinding direction. The leader portion normally does not protrude from the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner curved wall of the cassette shell. The trailing end of the filmstrip is secured to the film spool, and the leading end of the filmstrip is slightly tapered along one longitudinal edge purportedly to allow it to freely extend from between the circumferential lips and rest against the shell wall. During initial unwinding rotation of the film spool, the leading end of the filmstrip is advanced along the shell wall until it reaches an entry to a film passageway in the cassette shell. Then, it is advanced into and through the film passageway to the outside of the cassette shell. The passageway has a width that is slightly less than the width of the filmstrip, thus resulting in the filmstrip being transversely bowed as it is uncoiled from the film spool, and thereby facilitating movement of the film edges under the circumferential lips of the respective flanges.

While the film cassette disclosed in U.S. Pat. No. 4,423,943 includes a non-protruding film leader which is automatically advanced to the outside of the cassette shell when the film spool is rotated in the unwinding direction, the film cassette is intended to be loaded in a camera only after the film leader is advanced to protrude from the cassette shell. In the patent, it is suggested that one manually rotate the film spool relative to the cassette shell until the leader portion can be manually grasped and attached to a film advancing device in the camera. In order to attach the leader portion to the film advancing device, a row of metering perforations in the imaging portion of the filmstrip is continued along the leader portion.

THE CROSS-REFERENCED APPLICATIONS

Like the type of film cassette disclosed in U.S. Pat. No. 4,423,943, cross-referenced application Ser. No. [07/349,480] discloses a film cassette wherein a filmstrip beginning with a relatively short non-protruding leader portion can be advanced automatically to the exterior of the cassette responsive to rotation of a film spool in a film unwinding direction. However, in this instance, the filmstrip has one metering perforation per film frame in a relatively long imaging portion and several much closer spaced take-up perforations in its leader portion. Preferably, the take-up perforations are located along a different longitudinal edge of the filmstrip than the metering perforations are located, to positively prevent the possibility of mistaking one of the take-up perforations for one of the metering perforations in a camera.

SUMMARY OF THE INVENTION

The invention relates to a metering defeat mechanism in a photographic camera which prevents a film metering pawl from erroneously engaging take-up perforations in a leader portion of the filmstrip.

According to the invention, a photographic camera is adapted for use with a film cassette in which a filmstrip has a row of metering perforations in its imaging portion, adjacent a longitudinal film edge for engagement with a metering pawl of the camera, and a row of take-up perforations in its leader portion, adjacent the same film edge, for engagement with a take-up spool of the camera, and a film spool is rotatable to unwind the filmstrip off the spool to thrust the leader portion from the cassette. The camera includes a film sensing member for normally maintaining the metering pawl removed from a film advance path between the cassette and the take-up spool to prevent the pawl from erroneously engaging the leader portion at one of its take-up perforations. The sensing member is actuated to release the metering pawl, to allow the pawl to be moved into the film advance path to engage the imaging portion at one of its metering perforations, only after the leader portion has been advanced sufficiently from the cassette to move its take-up perforations out of reach of the pawl.

DETAILED DESCRIPTION OF THE PREFERRED EMBODIMENT

The invention is disclosed as being embodied preferably in a photographic camera adapted for use with a 35 mm film cassette. Because the features of this type of camera and film cassette are generally well known, the description which follows is directed in particular to elements forming part of or cooperating directly with the disclosed embodiment. It is to be understood, however, that other elements not specifically shown or described may take various forms known to persons of ordinary skill in the art.

THE FILM CASSETTE

Figure 1:
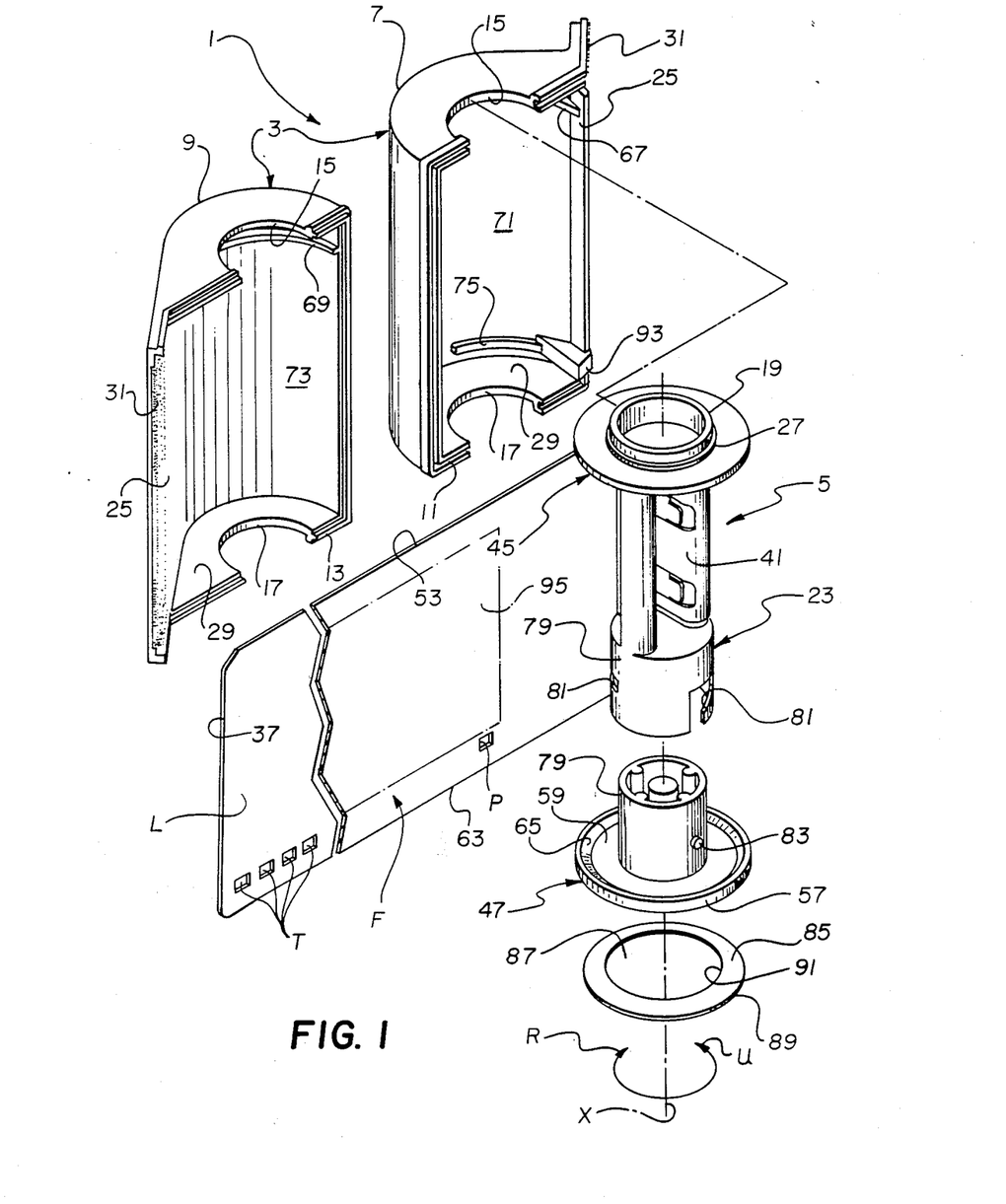
FIG. 1 is an exploded perspective view of the film cassette disclosed in cross-referenced application Ser. No. [our Docket No. 56,424]
Figure 2:
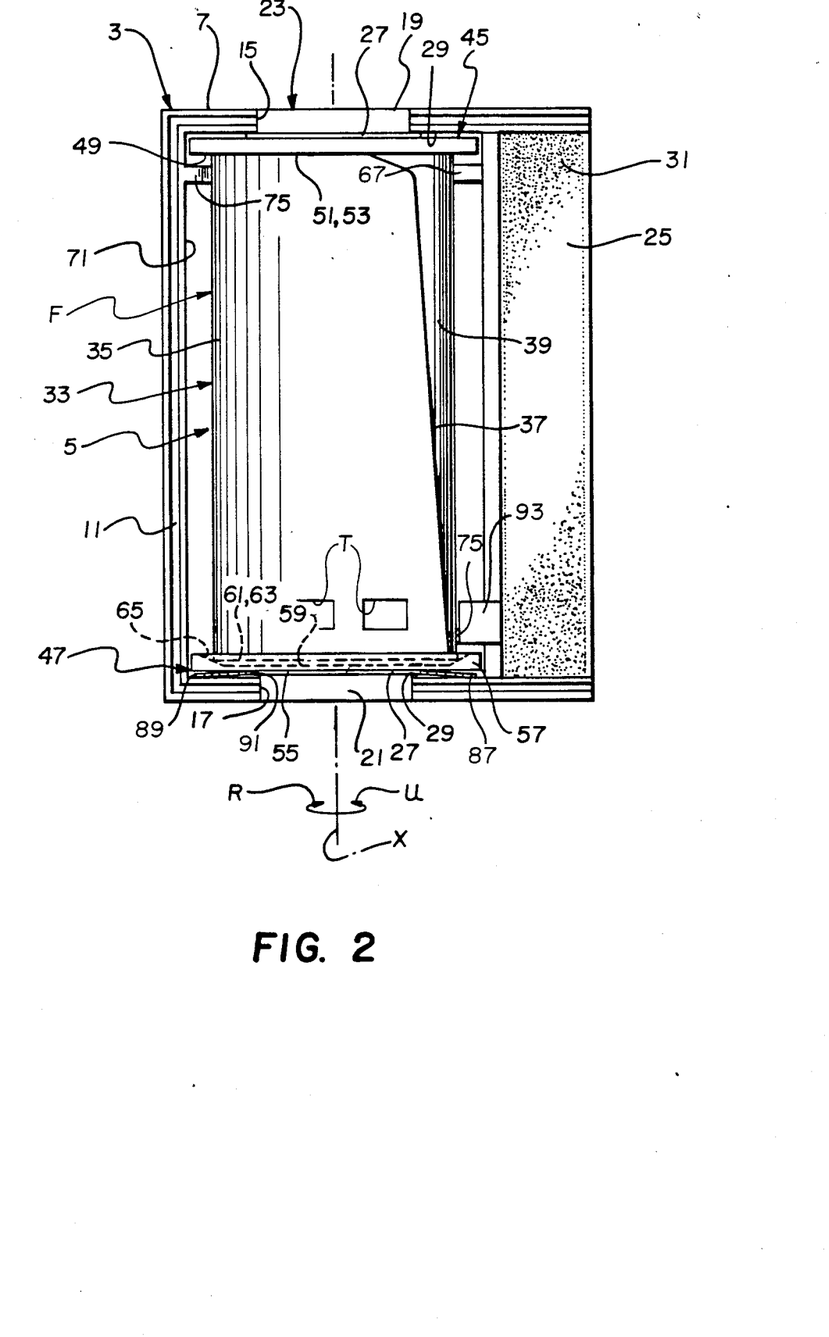
FIG. 2 is an elevation view of the film cassette, illustrating the cassette shell open to reveal a film roll coiled about a film spool.

Referring now to the drawings, FIGS. 1 and 2 depict an improved 35 mm film cassette 1 comprising a light-tight cassette shell 3 and a film spool 5 which is rotatable about an axis X in film unwinding and rewinding directions U and R within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for upper and lower opposite end extensions 19 and 21 of a spool core or hub 23, and they define a film passageway 25 to the exterior of the cassette shell 3. The upper and lower end extensions 19 and 21 of the spool core 23 include respective integral annular surrounds 27 located adjacent upper and lower inside faces 29 of the cassette shell 3 which encircle the two openings 15 and 17. This is to prevent ambient light from entering the interior of the cassette shell 3 through the openings 15 and 17. A known black velvet or plush material 31 lines the interior of the film passageway 25 to prevent ambient light from entering the film passageway.

Figure 3:
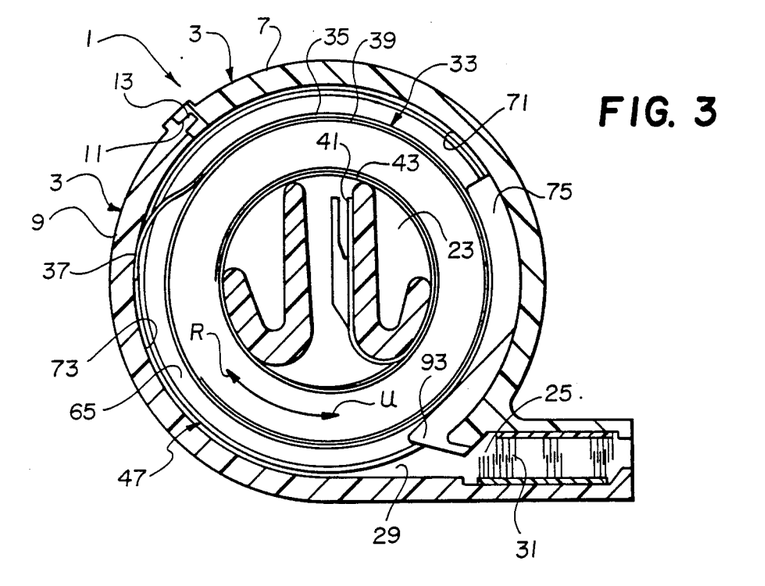
FIG. 3 is an end view in cross-section of the cassette shell, the film roll, and the film spool.
Figure 4:
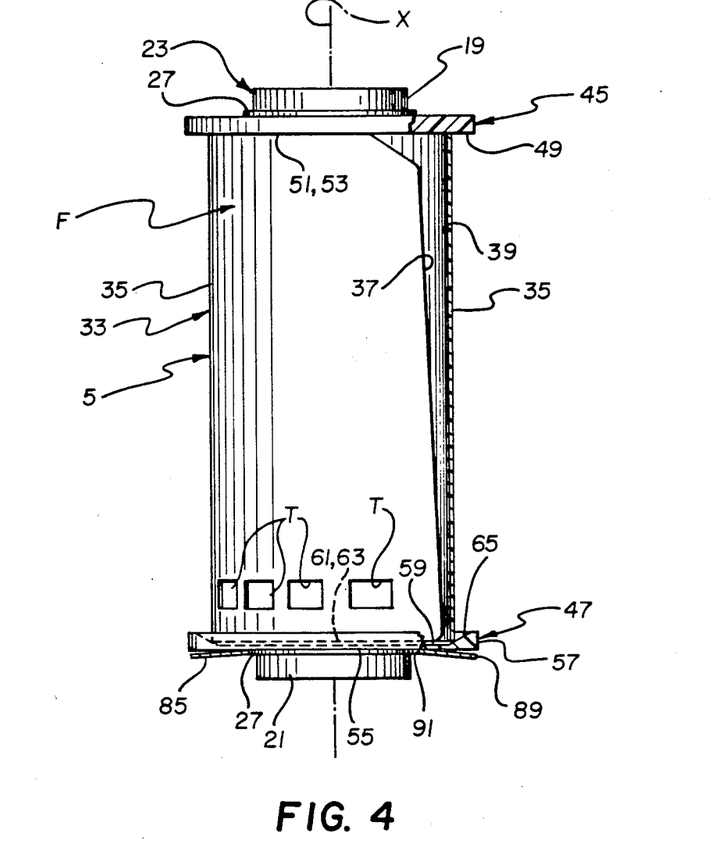
FIG. 4 is an elevation view partially in section of the film roll and the film spool, illustrating the manner in which the film roll is stored on the film spool.

A roll 33 of 35 mm filmstrip F is coiled about the spool core 23 to form successive film convolutions. As shown in FIG. 3, the film roll 33 includes an outermost convolution 35 which is a film leader having a leading or forward end 37, and it includes a next-inward convolution 39 coiled behind the outermost convolution. An inner or trailing end 41 of an innermost convolution 43 of the film roll 33 is secured to the spool core 23.

A pair of upper and lower flanges 45 and 47 radially extend from the spool core 23 as shown in FIGS, 1, 2, 4 and 5. The upper flange 45 is disk-like, and it has a circular flat inside face 49 that contacts an upper side 51 of the film roll 33 defined by the upper longitudinal edge 53 of each successive convolution of the film roll 33, including the outermost convolution (film leader) 35. The lower flange 47 comprises a disk portion 55 and an annular lip or skirt portion 57 which circumferentially extends from the disk portion. The disk portion 55 has an inside central annular flat face 59 that is closely spaced from a lower side 61 of the film roll 33 defined by the lower longitudinal edge 63 of each successive convolution of the film roll. The annular lip portion 57 has an inside peripheral annular beveled face 65 that is circumferentially inclined from the central flat face 59 to normally intimately contact the lower longitudinal edge 63 of the outermost convolution (film leader) 35 and perhaps the next-inward convolution 39 of the film roll 33, to radially constrain the film roll at the lower longitudinal edge and thereby restrict the maximum diameter of the film roll 33 to a value less than the diameter of the two flanges 45 and 47. The peripheral beveled face 65 has a width $W_p$ that is less than the width $W_e$ of the central flat face 59, and it is inclined an obtuse angle $A_o$ with respect to the central flat face. See FIG. 5. The obtuse angle $A_o$ is sufficient to allow the peripheral beveled face 65 to form a capture angle $A_e$ with respect to the outermost convolution (film leader) 35. Preferably the capture angle $A_e$ is within the range of 35° to 45°.

The maximum diameter of the film roll 33 may further be restricted to a value less than the diameter of the two flanges 45 and 47 by a pair of arcuate ribs 67 and 69 fixed to the two halves 7 and 9 of the cassette shell 3 at their respective inner walls 71 and 73 and by a single arcuate rib 75 fixed to the first-numbered inner wall. The three ribs 67, 69 and 75 protrude radially between the two flanges 45 and 47 to circumferentially confine the outermost convolution (film leader) 35 of the film roll 33. See FIGS. 1–3. Preferably, the ribs 67, 69 and 75 are relatively smooth at their respective areas of contact with the outermost convolution 35.

As shown in FIG. 1, the spool core 23 is comprised of two hollow, cylindrical, coaxial pieces 77 and 79. The upper core piece 77 is integrally formed with the upper flange 45 and the lower core piece 79 is integrally formed with the lower flange 47. The upper core piece 77 is constructed to telescopically receive the lower core piece 79 n order to vary the axial distance between the upper and lower flanges 45 and 47. The specific means for varying the axial distance between the two flanges 45 and 47 consists of a pair of inclined, opposite cam edges or ramps 81 located on the upper core piece 77 and respective cam follower pins 83 located on the lower core piece 79. If the lower core piece 79 is initially rotated relative to the upper core piece 77 in the film unwinding direction U, the interaction between the two cam edges 81 and the respective follower pins 83 will cause the lower core piece to be further received within the upper core piece, i.e. the lower core piece will be moved axially toward the upper core piece, thereby slightly reducing the axial distance between the two flanges 45 and 47. The lower core piece 79 can be moved axially toward the upper core piece 77 only until the peripheral beveled face 65 of the lower flange 47 is moved into a very firm compressive relation with the lower longitudinal edge 63 of the outermost convolution (film leader) 35. Then, continued rotation of the lower core piece 79 in the unwinding direction will rotate the film roll 33 in the same direction.

Figure 5:
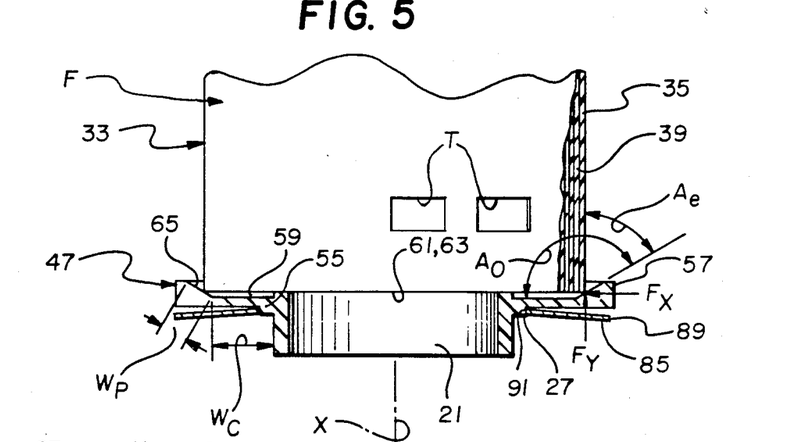
FIG. 5 is an elevation view partly in section similar to FIG. 4, illustrating certain details of the film roll and the film spool.

When the lower core piece 79 is moved axially toward the upper core piece to shift the peripheral beveled face 65 of the lower flange 47 into a very firm compressive relation with the lower longitudinal edge 63 of the outermost convolution (film leader) 35, axial clamping forces are concentrated for the most part at the outermost convolution. FIG. 5 schematically illustrates the X-component $F_x$ and the Y-component $F_y$ of these clamping forces at the outermost convolution 35. Thus, the $F_x$ force component acts to radially constrain the outermost convolution (film leader) 35 at its lower longitudinal edge 35, and the $F_y$ component acts to ensure a non-slipping relation between that longitudinal edge and the peripheral beveled face 65 of the lower flange 47. The non-slipping relation is necessary to rotate the outermost convolution 35 in the unwinding direction U responsive to rotation of the film spool 5 in the same direction.

A spring-washer 85 as shown in FIGS. 1 and 2 has a central opening 87 through which the lower extension 21 of the spool core 23 axially extends. The spring washer 85 has a circumferential edge 89 in contact with the lower inside edge 29 of the cassette shell 3 and an inner edge 91 (defining the central opening 87) in contact with the annular surround 27 of the lower extension. Thus, the spring-washer 85 operates as a compressive spring to normally urge the peripheral beveled face 65 of the lower flange 47 against the lower longitudinal edge 63 of the outermost convolution (film leader) 35. See FIG. 5.

A film-stripper guide 93 formed with the cassette half 7 is positioned immediately inward of the inner entry to the film passageway 25 to be received between the leading end 37 of the outermost convolution (film leader) 35 and the next-inward convolution 39, to pick up the leading end and guide it into the film passageway responsive to rotation of the film spool 5 in the film unwinding direction U during application of the axial clamping forces. The leading end 37 will be advanced over the stripper-guide 93 and into the film passageway 25, rather than between the stripper-guide and the next-inward convolution 39, because it tends to be transversely bowed by the axial clamping forces and therefore will slightly separate from the next-inward convolution 39 of the film roll 5

Figure 6:
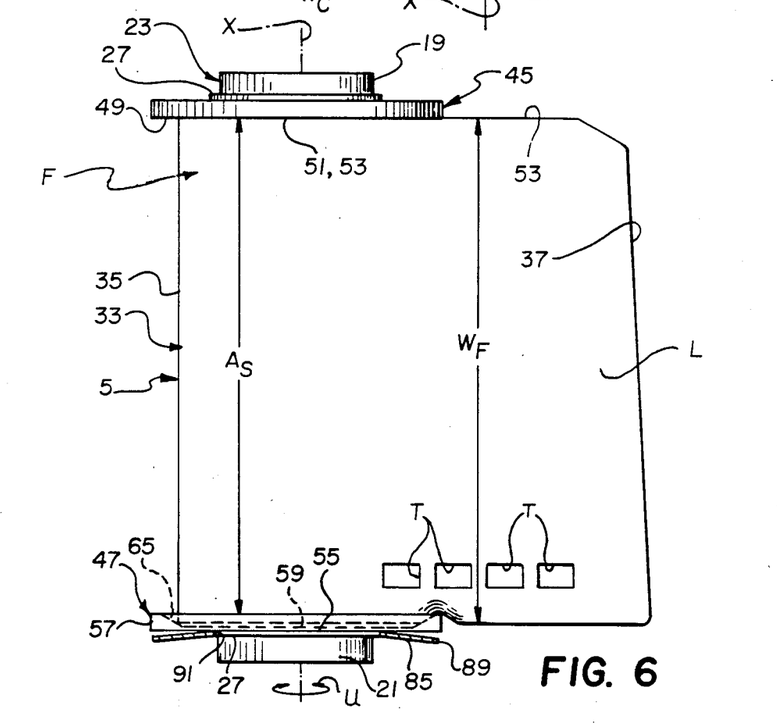
FIG. 6 is an elevation view similar to FIG. 4 illustrating the manner in which the film roll is unwound from the film spool.

When the leading end 37 of the outermost convolution (film leader) 35 is advanced over the stripper-guide 93 responsive to rotation of the film spool 5 in the film unwinding direction U during application of the axial clamping forces, the lower longitudinal edge 63 of that convolution will be slightly flexed by the annular lip portion 57 of the lower flange 47 as shown in FIG. 6 to allow successive longitudinal sections of the film roll 33 (beginning with the leading end) to exit from between the flanges to the outside of the cassette shell 3. The local flexing of the lower longitudinal edge 63 of the outermost convolution 35 occurs because the film width $W_F$ between that edge and the upper longitudinal edge 63 of the outermost convolution is slightly greater than the axial spacing $A_S$ between the upper flange 45 and the annular lip portion 57 of the lower flange 47.

Figure 7:
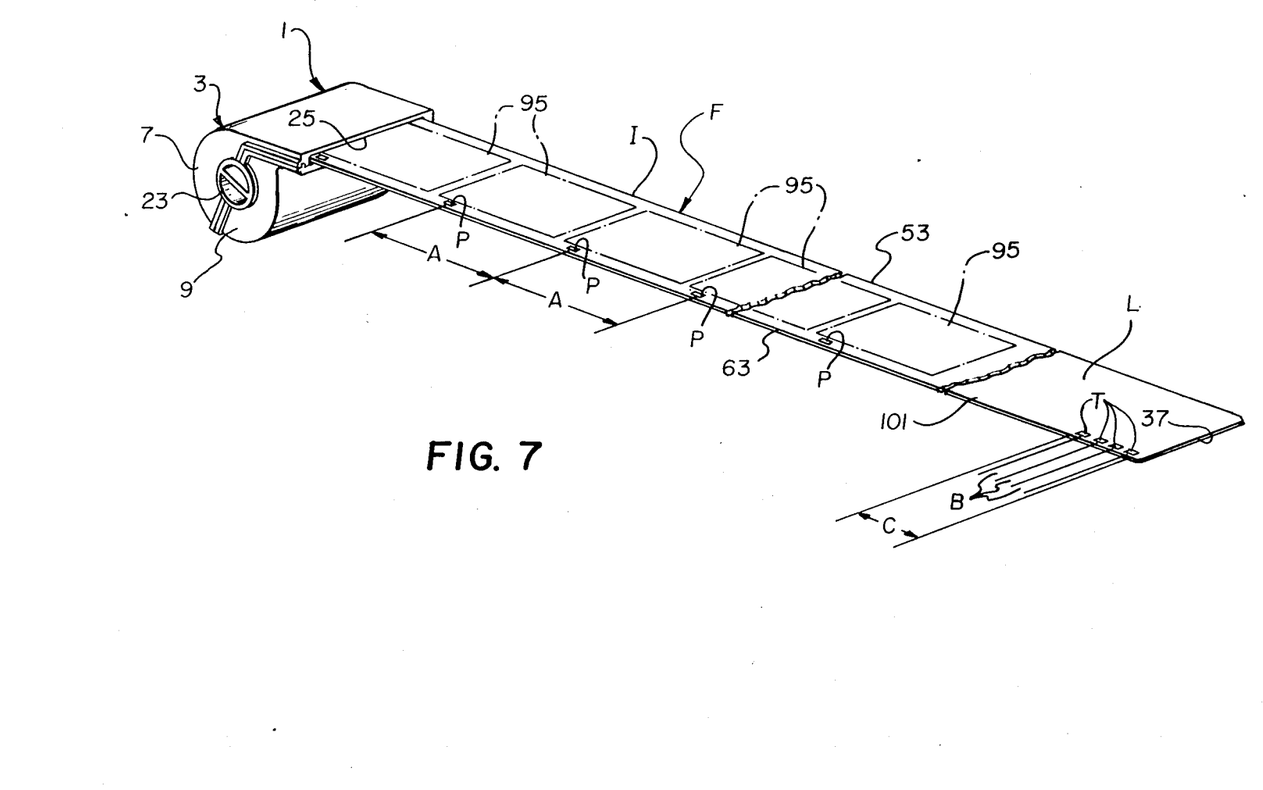
FIG. 7 is a perspective view of the film cassette and the filmstrip, illustrating the filmstrip advanced to the exterior of the cassette shell.

FIG. 7 shows the filmstrip F advanced for the most part from the cassette shell 3. According to the illustration, the filmstrip F has a relatively short leader portion L and a relatively long imaging portion I which includes a single row of spaced identical metering perforations P located adjacent to the longitudinal edge 63 of the filmstrip. As is previously known, the metering peforations P have a common pitch A. That is, there is one metering perforation for each imaging area or film frame 95 to enable the imaging portion I to be conventionally metered for picture-taking in a camera. Conversely, the leader portion L includes only four spaced identical take-up perforations T having a common pitch B that is considerably less than the pitch A of the metering perforations P. The take-up perforations T are located adjacent the longitudinal edge 63 of the filmstrip F, close to the leading end 37 of the leader portion L in order to enable a conventional toothed take-up drum or spool in a camera to promptly engage the leader portion. The take-up perforations T occupy a total film length C that is less than the pitch A of the metering perforations P, and they are separated from the latter perforations by an imperforate film section 101 having a film length that is greater than the pitch of the metering perforations.

THE PHOTOGRAPHIC CAMERA

Referring now to FIGS. 8–12, an improved metering defeat mechanism 102 for a photographic camera 103 is depicted for use with the film cassette 1. The camera body 105 is shown with a front lens shield 107; a side door 109 opening to a cassette-receiving chamber 111; a separate film take-up chamber 113; a conventional backframe opening (film-exposure aperture) 115 intermediate the two chambers; and a film guide channel 117 which defines a film advance path 119 from the cassette-receiving chamber, across the backframe opening, and to the take-up chamber. The particular portion of the film advance path 119 which extends across the backframe opening 115 is designated as 119' in FIG. 10. A rotatably supported conventional take-up drum or spool 121 having several evenly spaced peripheral teeth 123 for engaging the leader portion L of the filmstrip F at its respective take-up perforations T is located in the take-up chamber 113. A suitable motor-driven film transport apparatus, not shown, for rotating the film spool 5 of the film cassette 1 in the film unwinding and rewinding directions U and R and for similarly rotating the take-up spool 121 is disclosed in cross-referenced application Ser. No 221,995 incorporated herein.

Figures 8, 9:
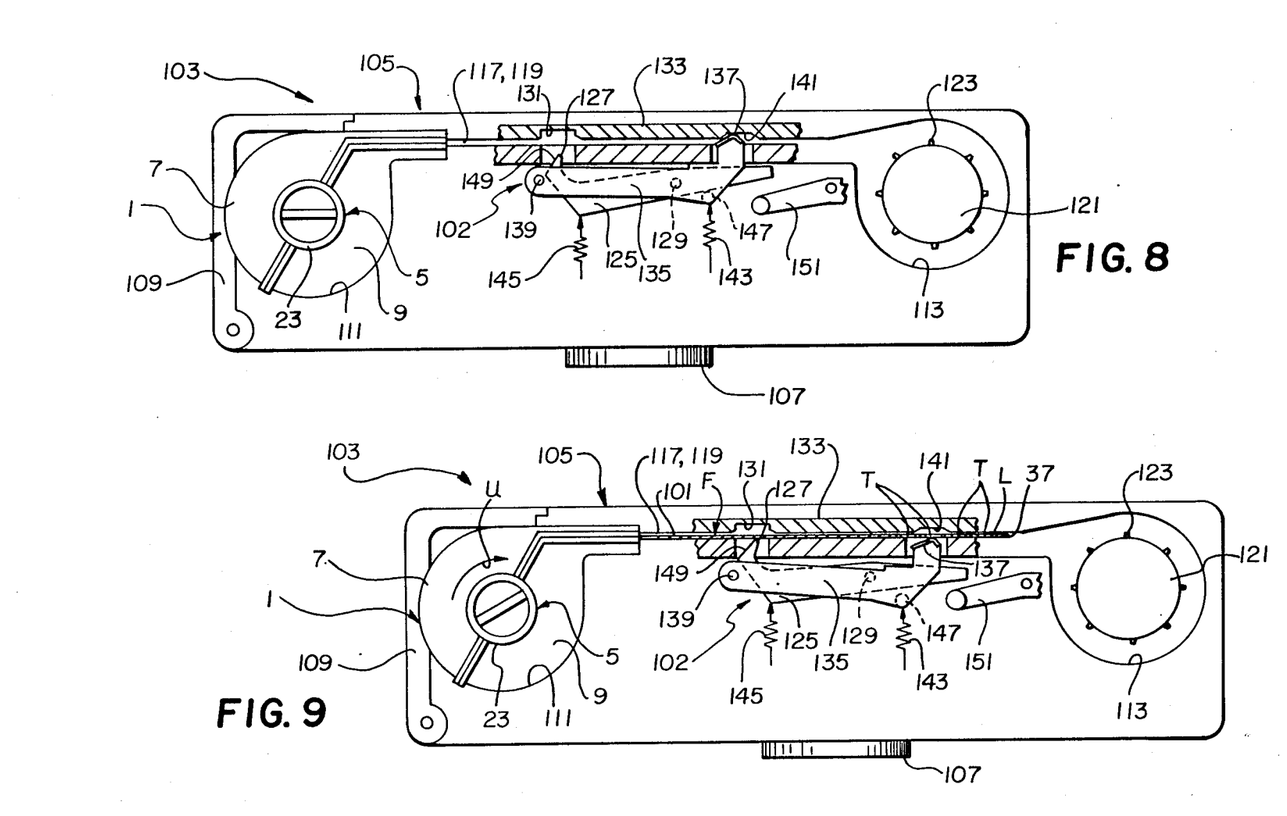
FIG. 8 is a plan view of a metering defeat mechanism in a camera for use with the film cassette, according to a preferred embodiment of the invention.
FIG. 9 is a plan view similar to FIG. 8, illustrating initial operation of the metering defeat mechanism.
Figure 10:
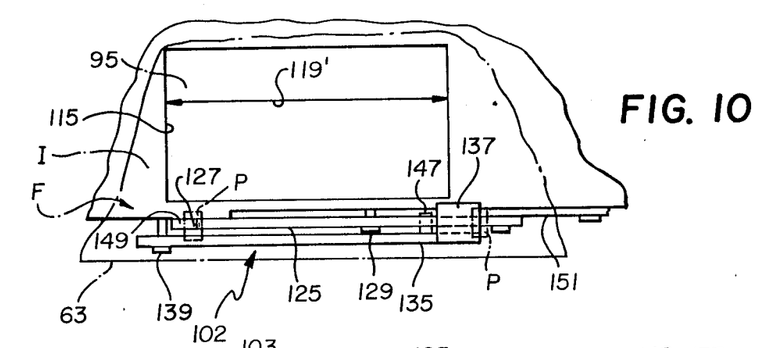
FIG. 10 is an elevation view of the metering defeat mechanism.
Figure 11:
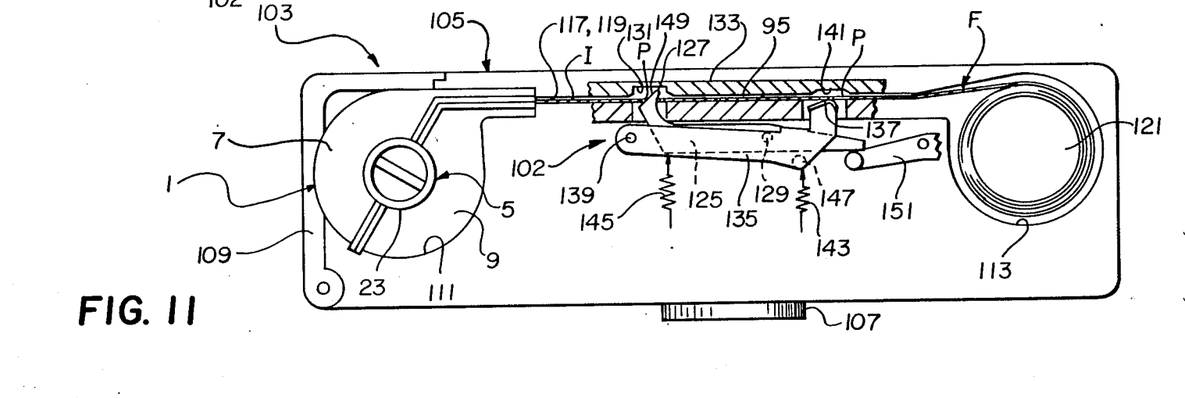
FIGS. 11 and 12 are plan views similar to FIG. 9, illustrating further operation of the metering defeat mechanism.
Figure 12:
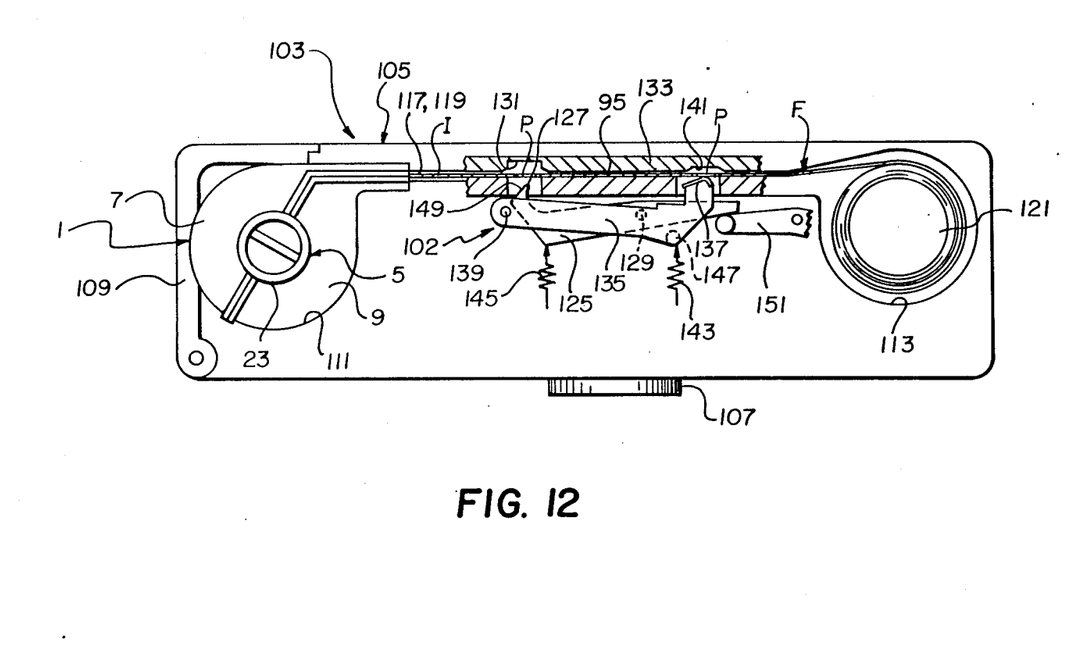

A metering pawl 125 having an end tooth 127 for engaging the imaging portion I of the filmstrip F at its respective metering perforations P preparatory to each exposure of the filmstrip at the backframe opening 115 is mounted via a pivot pin 129 for pivotal movement about the pin between a retracted or idle position, shown in FIG. 8, in which the end tooth is spaced from the film advance path 119, a ready position, shown in FIG. 9, in which the end tooth is supported by a limited section of the filmstrip F in the film advance path at a location usually between any two successive metering perforations P, and a metering position, shown in FIG. 11, in which the end tooth extends through one of the metering perforations into a recess 131 in a conventional film pressure plate 133. As is known, when the metering pawl 125 is in its metered position, one of the imaging areas 95 of the filmstrip F will be in alignment with the backframe opening 115.

A film sensing lever 135 having an end flange 37 which is too large to drop into one of the take-up perforations T or metering perforations P of the filmstrip F is mounted via a pivot pin 139 for pivotal movement about the pin between a ready position, shown in FIG. 8, in which the end flange extends into the film advance path 119 to protrude within a recess 141 in the pressure plate 133, and a sensing position, shown in FIGS. 9-12, in which the end flange is supported by a limited section of the filmstrip in the film advance path. A spring 143 urges the film sensing lever 35 into its ready position, shown in FIG. 8. A spring 145, considerably weaker than the spring 143, urges the metring pawl 125 into its metering position, shown in FIG. 11. When the film sensing lever 135 is in its ready position, an integral retaining stud 147 on the sensing lever holds the metering pawl 125 in its retracted position, contrary to the urging of the spring 145. See FIG. 8.

OPERATION

To begin with, the film spool 5 of the film cassette 1 is rotatably driven in the film unwinding direction U to unwind the filmstrip off the spool to thrust the leader portion I of the filmstrip from the cassette shell, along the film advance path 119. See FIG. 9. As the forward end 37 of the filmstrip F moves over the end flange 137 of the film sensing lever 135, the film end cams the lever from its ready position, shown in FIG. 8, to its sensing position, shown in FIG. 9. Consequently, the retaining stud 147 of the sensing lever 135 will be moved to allow the spring 145 to pivot the metering pawl 125 from its retracted position, shown in FIG. 8, to its ready position, shown in FIG. 9. When the metering pawl 125 is moved to its ready position, the end tooth 127 of the pawl cannot erroneously engage the leader portion I at one of its take-up perforations T since those perforations have already been advanced out of reach of the end tooth. See FIG. 9.

The take-up spool 121 is rotatably driven in a winding or take-up direction similar to the unwinding direction U that the film spool 5 of the film cassette 1 is rotatably driven. This enables the teeth 123 of the take-up spool 121 to engage the leader portion L of the filmstrip F at respective ones of the take-up perforations T in the leader portion. Then, the rotatable drive to the film spool 5 is discontinued, and substantially the entire length of the filmstrip 5 including its imaging portion I is continuously wound onto the take-up spool 121 without exposing any of the imaging portion at the imaging areas 95. Each time a metering perforation P in the imaging portion I moves over the end tooth 127 of the metering pawl 125, the spring 145 urges the end tooth into that perforation. However, the end tooth 127 has an inclined edge 149 which allows it to be cammed out of the metering perforation by a trailing edge of the perforation. Thus, as is well known, a count can be obtained of the total number of the imaging areas 95 of the filmstrip F available to be exposed.

To locate the first of the imaging areas 95 of the filmstrip F for exposure, after substantially the entire length of the filmstrip has been continuously wound onto the take-up spool 121, the film spool 5 of the film cassette 1 is rotatably driven in the film rewinding direction R until the end tooth 127 of the metering pawl 125 drops into the particular metering perforation P in the filmstrip which immediately precedes that imaging area. This approach is commonly referred to as "expose-on-rewind". Typically, the rotational drive to the take-up spool 121 is discontinued, although a drag is imposed on the take-up spool to maintain film tension along the film advance path 119. After the first imaging area is exposed, a known trip lever 151 is actuated responsive to actuation of the motor-driven film transport mechanism disclosed in cross-referenced Ser. No. 221,995 incorporated herein, or to shutter closing, for example, to pivot the metering pawl to its retracted position, shown in FIG. 12. Then, the exposed imaging area is rewound into the film cassette. Once the particular metering perforation P which immediately precedes the exposed imaging area is moved out of reach of the end tooth 127 of the metering pawl 125, the trip lever 151 can be retracted from the pawl by known means, not shown, to allow the spring 145 to return the pawl to its ready position, shown in FIG. 9.

The invention has been described with reference to a preferred embodiment. However, it will be appreciated that variations and modifications can be effected within the ordinary skill in the art without departing from the scope of the invention. For example, a film cassette could be used with the metering defeat mechanism 102 in which the forward end 37 of the filmstrip F normally slightly protrudes from the cassette shell. Moreover, rather than exposing each imaging area 95 of the filmstrip F and then immediately returning the exposed imaging area to the film cassette 1, the exposed imaging area could be wound onto the take-up spool 121 according to custom.

I claim:

1. A metering defeat mechanism for a photographic camera to be used with a film cassette in which a filmstrip has a relatively short nonprotruding leader portion, including a row of take-up perforations adjacent a longitudinal film edge for enabling the leader portion to be engaged by a toothed take-up spool in the camera, and a relatively long imaging portion, including a row of metering perforations adjacent the same film edge for enabling the imaging portion to be engaged by a metering member in the camera preparatory to each exposure, and a film spool is rotatable to unwind the filmstrip off the spool to thrust the leader portion from the cassette to enable the leader portion to be moved in the camera along a film advance path to said take-up spool, characterized in that said metering defeat mechanism comprises:

actuation means for moving said metering member ino the film advance path to permit the metering member to engage the imaging portion at one of its metering perforations, and film sensing means for normally maintaining said metering member removed from the film advance path to prevent the metering member from being moved into said advance path to erroneously engage the leader portion at one of is take-up perforations, but responsive to sensing the leader portion for allowing said metering member to be moved into the film advance path only after the take-up perforations are out of reach of said metering member.

2. A metering defeat mechanism as recited in claim 1, wherein said film sensing means includes a film sensing member normally positioned at a location in the film advance path, for sensing the leader portion, that is substantially closer to said take-up spool than to the location in said advance path to which said metering member is moved to engage the imaging portion.

3. A metering defeat mechanism as recited in claim 2, wherein said film sensing member is adapted to be cammed from the film advance path by a forward edge of the leader portion to allow said metering member to be moved into said advance path.

4. A metering defeat mechanism as recited in claim 3, wherein said film sensing member is mounted for pivotal movement into and from the film advance path and the sensing member has integral means for removing said metering member from said advance path responsive to pivoting of the sensing member into the advance path and for allowing the metering member to be moved to the advance path responsive to pivoting of the sensing member from the advance path.

5. A metering defeat mechanism as recited in claim 2, wherein said camera includes a backframe opening alongside an intermediate portion of the film advance path, and the respective locations in the film advance path for said metering member and said film sensing member are at least spaced from each other by the intermediate portion of said advance path.

* * * * *

UNITED STATES PATENT AND TRADEMARK OFFICE
CERTIFICATE OF CORRECTION

PATENT NO. : 4,914,462

DATED : April 3, 1990

INVENTOR(S) : Daniel M. Pagano

It is certified that error appears in the above-identified patent and that said Letters Patent is hereby corrected as shown below:

| | |
|---|---|
| Col. 1, line 13 | delete "221,995" and substitute therefor --221,955--. |
| Col. 2, line 34 | delete "[" and "]" that surround "07/349,480". |
| Col. 3, line 9 | delete "[" and "]" that surround "our Docket No. 46,424". |
| Col. 5, line 38 | delete "edge" and substitute therefor --face--. |
| Col. 6, line 16 | delete "peforations" and substitute therefor --perforations--. |
| Col. 6, line 58 | delete "221,995" and substitute therefor --221,955--. |
| Col. 7, line 9 | delete "37" and substitute therefor --137--. |
| Col. 8, line 15 | delete "221,995" and substitute therefor --221,955--. |

Signed and Sealed this

Third Day of September, 1991

Attest:

HARRY F. MANBECK, JR.

*Attesting Officer*   *Commissioner of Patents and Trademarks*